(12) United States Patent
Lefebvre et al.

(10) Patent No.: US 8,972,693 B2
(45) Date of Patent: Mar. 3, 2015

(54) HARDWARE MANAGED ALLOCATION AND DEALLOCATION EVALUATION CIRCUIT

(75) Inventors: Laurent Lefebvre, Mascouche (CA); Michael Mantor, Orlando, FL (US)

(73) Assignees: Advanced Micro Devices, Inc., Sunnyvale, CA (US); ATI Technologies ULC, Markham, Ontario (CA)

( * ) Notice: Subject to any disclaimer, the term of this patent is extended or adjusted under 35 U.S.C. 154(b) by 265 days.

(21) Appl. No.: 13/433,901

(22) Filed: Mar. 29, 2012

(65) Prior Publication Data

US 2013/0262812 A1    Oct. 3, 2013

(51) Int. Cl.
*G06F 12/00* (2006.01)
(52) U.S. Cl.
USPC .......................................... 711/171
(58) Field of Classification Search
None
See application file for complete search history.

(56) References Cited

U.S. PATENT DOCUMENTS

| 7,533,236 | B1 | 5/2009 | Nordquist |
| 7,752,413 | B2 * | 7/2010 | Hoover et al. ................ 711/170 |
| 2005/0166032 | A1 | 7/2005 | Noeske et al. |
| 2011/0055511 | A1 | 3/2011 | Mantor et al. |
| 2013/0262834 | A1 | 10/2013 | Lefebvre et al. |

OTHER PUBLICATIONS

International Search Report directed to related International Application No. PCT/US2013/033157, mailed on Jul. 10, 2013; 3 pages.
Written Opinion directed to related International Application No. PCT/US2013/033157, mailed on Jul. 10, 2013; 4 pages.
U.S. Appl. No. 13/433,939, Lefebvre et al., "Hardware Managed Ordered Circuit," filed Mar. 29, 2012.

* cited by examiner

*Primary Examiner* — Brian Peugh
(74) *Attorney, Agent, or Firm* — Volpe and Koenig, P.C.

(57) ABSTRACT

A system and method is provided for improving efficiency, power, and bandwidth consumption in parallel processing. Rather than using memory polling to ensure that enough space is available in memory locations for, for example, write instructions, the techniques disclosed herein provide a system and method to automate this evaluation mechanism in environments such as data-parallel processing to efficiently check available space in memory locations before instructions such as write threads are allowed. These operations are handled efficiently in hardware, but are flexible enough to be implemented in all manner of programming models.

18 Claims, 4 Drawing Sheets

HARDWARE MANAGED ALLOCATION AND DEALLOCATION EVALUATION CIRCUIT

BACKGROUND

1. Field of the Present Invention

The present invention relates generally to computing processing and, more particularly, to an evaluation circuit for memory allocation and deallocation requests for processing devices.

2. Description of the Related Art

Processing units are capable of executing processes or threads without regard to the order in which the processes or threads are dispatched. The out of order execution of processes or threads gives the processing units the ability to better utilize the latency hiding resources, to increase their efficiency, and to improve their power and bandwidth consumption.

Environments in which numerous concurrently executing processes or threads cooperate to implement an application is found, for example, in graphics processor units (GPU). GPUs are rapidly increasing in processing power due in part to their incorporation of multiple processing units, each of which is capable of executing an increasingly large number of threads. In many graphics applications, multiple processing units of a processor are utilized to perform parallel geometry computations, vertex calculations, pixel operations, and the like. For example, graphics applications can often be structured as single instruction multiple data (SIMD) processes. In SIMD processing, the same sequence of instructions is used to process multiple parallel data streams in order to yield substantial speedup of operations. Modern GPUs incorporate an increasingly large number of SIMD processors, where each SIMD processor is capable of executing an increasingly large number of threads.

When a GPU processes an image, for example, numerous threads may concurrently execute to process pixels from that image according to a single instruction stream. Each pixel or group of pixels can be processed by a separate thread. Some instructions cause threads to write to a memory, other instructions cause threads to read from the memory, and yet other instructions causes no thread interactions with memory. When instructions cause threads to, for example, write to the memory, it is important that a check mechanism be put in place to ensure that the memory area where the threads want to write has enough space. Current implementations use memory polling to poll memory locations to determine the age of the thread, then lock this memory location to write to the memory buffer. Typically, these implementations need to poll the memory again to ensure that enough space is available to write to the memory location. These implementations are inefficient and power and bandwidth consuming.

SUMMARY OF EMBODIMENTS

Therefore, apparatus and methods are needed to automate evaluation mechanisms in environments such as data-parallel processing to efficiently check available space in memory locations before instructions such as write threads are allowed.

An embodiment of the present invention includes an apparatus including an evaluation circuit. The evaluation circuit is configured to receive a request to access the memory. The evaluation circuit is further configured to access a register to determine an amount of available space in the memory associated with the request and when the determined amount of available space accommodates an amount of data associated with the request, update the amount of available space stored in the register based on the amount of data.

Another embodiment of the present invention includes a method including receiving a request, by an evaluation circuit, to access a memory and accessing a register to determine an amount of available space in the memory associated with the request. When the determined amount of available space accommodates an amount of data associated with the request, the amount of available space, which is stored in the register is updated based on the amount of data.

Another embodiment of the present invention includes an article of manufacture including a computer-readable storage medium having instructions stored thereon, execution of which by a computing device causes the computing device to perform operations including receiving a request to access a memory and accessing a register to determine an amount of available space in the memory associated with the request. When the determined amount of available space accommodates the amount of data associated with the request, the amount of available space stored in the register is updated based on the amount of data.

Further features and advantages of the present invention, as well as the structure and operation of various embodiments of the present invention, are described in detail below with reference to the accompanying drawings. It is noted that the present invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form a part of the specification, illustrate embodiments of the present invention and, together with the description, further serve to explain the principles of the present invention and to enable a person skilled in the relevant art to make and use the present invention.

Figure 1:
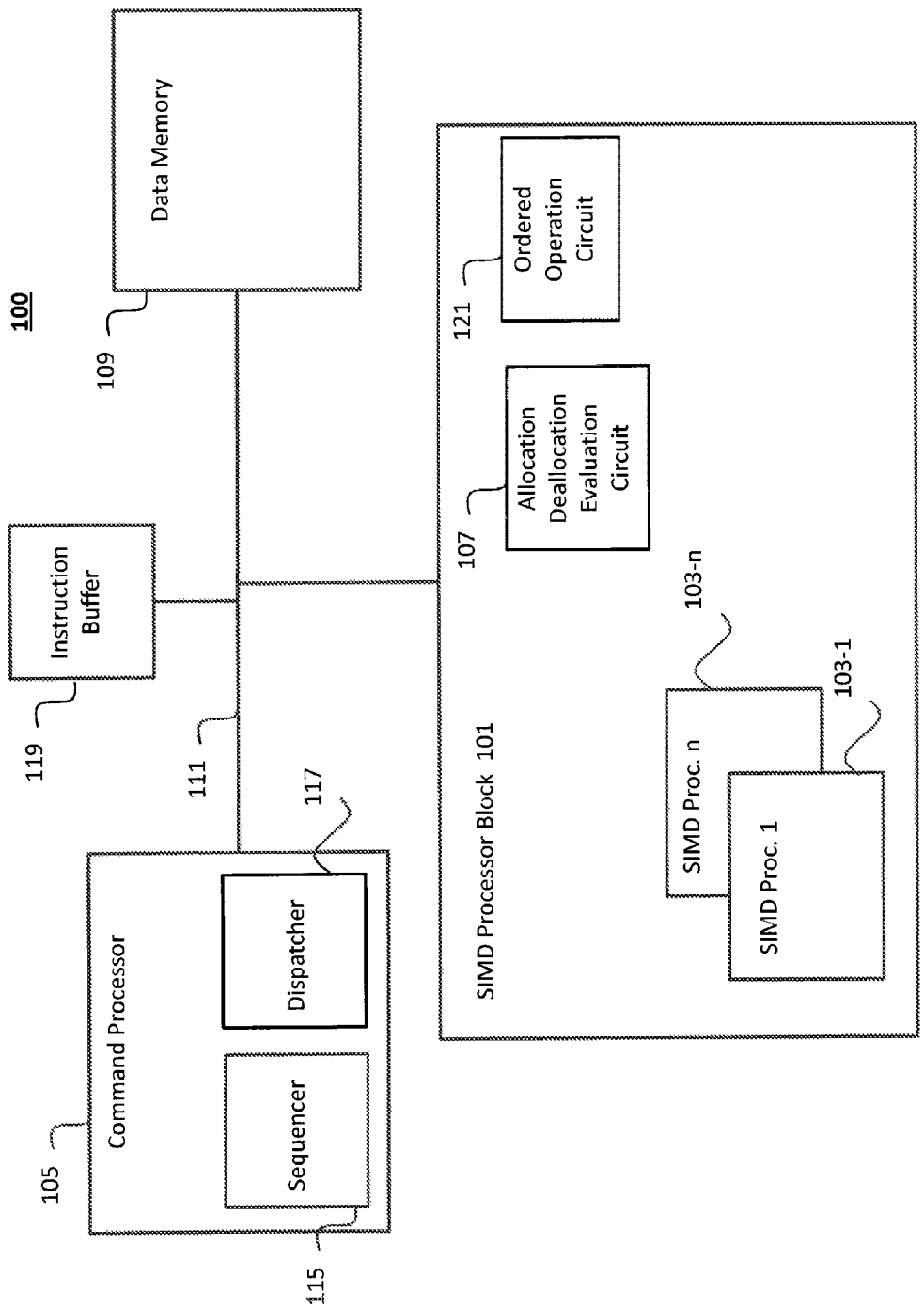
FIG. 1 illustrates a system for evaluating available space in a memory, in accordance with an embodiment of the present invention.

The present invention will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

The following detailed description of the present invention refers to the accompanying drawings that illustrate exemplary embodiments consistent with this invention. Other embodiments are possible, and modifications can be made to the embodiments within the spirit and scope of the present invention. Therefore, the detailed description is not meant to limit the present invention. Rather, the scope of the present invention is defined by the appended claims.

It would be apparent to one of skill in the art that aspects of the present invention, as described below, can be implemented in many different embodiments of software, hardware, firmware, and/or the entities illustrated in the figures. Any actual software code with the specialized control of hardware to implement the present invention is not limiting of the present invention. Thus, the operational behavior of the present invention will be described with the understanding that modifications and variations of the embodiments are possible, given the level of detail presented herein.

This specification discloses one or more embodiments that incorporate the features of this invention. The disclosed embodiment(s) merely exemplify the invention. The scope of the invention is not limited to the disclosed embodiment(s). The invention is defined by the claims appended hereto.

The embodiment(s) described, and references in the specification to "one embodiment", "an embodiment", "an example embodiment", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

Additionally, and as will be apparent to one of ordinary skill in the art, the simulation, synthesis and/or manufacture of the various embodiments of this invention may be accomplished, in part, through the use of computer readable code (as noted above), including general programming languages (such as C or C++), hardware description languages (HDL) including Verilog HDL, VHDL, Altera HDL (AHDL) and so on, or other available programming and/or schematic capture tools (such as circuit capture tools). This computer readable code can be disposed in any known computer usable medium including semiconductor, magnetic disk, optical disk (such as CD-ROM, DVD-ROM) and as a computer data signal embodied in a computer usable (e.g., readable) transmission medium (such as a carrier wave or any other medium including digital, optical, or analog-based medium). As such, the code can be transmitted over communication networks including the Internet and internets. It is understood that the functions accomplished and/or structure provided by the systems and techniques described above can be represented in a core (such as a graphics processing unit (GPU) core) that is embodied in program code and may be transformed to hardware as part of the production of integrated circuits. As will be appreciated, other types of cores or processing units can provide the functions and/or structure embodying aspects of the present invention. These processing units may include, for example, central processing units (CPUs), the aforementioned graphics processing units, digital signal processors, application processors and the like.

Reference to modules in this specification and the claims means any combination of hardware or software components for performing the indicated function. A module need not be a rigidly defined entity, such that several modules may overlap hardware and software components in functionality. For example, a software module may refer to a single line of code within a procedure, the procedure itself being a separate software module. One skilled in the relevant arts will understand that the functionality of modules may be defined in accordance with a number of stylistic or performance-optimizing techniques, for example.

FIG. 1 illustrates an exemplary embodiment where an evaluation circuit for memory allocation and deallocation requests is embodied in a graphics processor unit (GPU) 100. Although, this example is in accordance with GPU 100, it should be apparent that the teachings of this disclosure are applicable to many other types of processors and processing. For example, an embodiment of the present invention is a multi-processor computer having parallel executing processes for different processing tasks or applications. However, the teachings of this disclosure can be used in any processing environments having concurrently executing threads.

In this example, GPU 100 includes, but is not limited to, a SIMD processor block 101, a command processor 105, a data memory 109, and a communication infrastructure 111. In one embodiment, GPU 100 could be communicatively connected to a central processing unit (CPU) (not shown) to process various tasks such as graphics processing and other tasks related to parallel processing. In another embodiment, GPU 100 can be a general purpose GPU (GPGPU) either performing a multitude of different tasks as a co-processor of a CPU, or performing the functions of the CPU.

In one example, SIMD processor block 101 includes one or more processing units, such as data-parallel thread processors, for example, SIMD processors 103-1 and 103-$n$. SIMD processor block 101 includes the functionality to perform various processing tasks on GPU 100. In an example where more than one SIMD is used, each SIMD processor 103-1 and 103-$n$ (collectively SIMD processor 103) is configured to execute one or more concurrent threads, each thread performing a part of the processing for one or more tasks assigned to the SIMD processing block 101.

For example, in an application rendering images to a display screen, each SIMD processor 103 may execute multiple threads so that pixels of the image being rendered can be processed concurrently. In executing a stream of instructions, the SIMD processor 103 can execute one or more threads concurrently to process application data. For purpose of clarity, the following description considers wavefront as a group of threads executing on a single processing unit, such as SIMD processor 103-1.

In one example, command processor 105 includes the functionality to coordinate the functions of GPU 100. For example, command processor 105 can receive instructions from a CPU (not shown) and issue corresponding instructions for processing by processors in SIMD processor block 101. In an embodiment of the present invention, command processor 105 can include a sequencer 115 and/or a dispatcher 117. Sequencer 115 may include the functionality to coordinate read/write conflicts between wavefronts. For example, sequencer 115 can ensure that a wavefront to read certain data is not launched until a wavefront producing (i.e., writing) that data has completed operation. In one example, dispatcher 117 may include the functionality to launch one or more wavefronts on one or more corresponding SIMD processors. For example, an application instruction received from the CPU can cause command processor 105 to schedule numerous threads to render an image by processing pixels of the image in parallel. The dispatcher 117 may include functionality to determine how the threads can be grouped into wavefronts such that, for example, each wavefront executes on a separate SIMD processor.

According to one example, the dispatcher 117 can launch the wavefronts in coordination with the sequencer 115 that controls the sequencing of wavefronts, for example, based on application requirements and/or read/write conflicts. In an embodiment, a wavefront identifier may be associated with each wavefront upon launch, where the wavefront identifier represents an ordering of wavefronts related, for example, to a particular application. In some embodiments, the wavefront identifier can be used to allocate and/or deallocate (e.g., assign) memory blocks according to an ordering scheme of the wavefronts. Subsequent to the launch, the wavefronts or more particularly the threads corresponding to the wavefronts, execute concurrently.

In one example, data memory 109 can include one or more memory components for use by threads executing in SIMD processor block 101. For example, data memory 109 can include one or more of graphics memory, framebuffer memory, or other memory local to SIMD processor block 101. In yet another embodiment, data memory 109 can include system memory.

According to an exemplary embodiment, command processor 105 can parse instruction from, for example, a CPU, and may generate a sequence of instructions to be executed by the SIMD processor block 101. The sequence of instructions generated by command processor 105 may be enqueued in an instruction buffer 119. SIMD processors 103 dequeue instructions from the instruction buffer 119 in sequence. Based on the type of instruction, threads already executing on the SIMD processors 103 may be affected, or new threads may be initiated (launched). Some such threads may require access to memory as writers (e.g., writer threads) to write to memory, or as readers (e.g., reader threads) to read from memory. In the description below, writer threads are associated with allocation requests for allocated memory for writing and reader threads are associated with deallocation request for assigned memory for reading.

According to one embodiment, the GPU 100 includes an allocation/deallocation evaluation circuit 107. Allocation/deallocation evaluation circuit 107 is configured to intercept the allocation requests and/or the deallocation requests between, for example, the SIMD processor 103 and the data memory 109, to determine whether the memory location of, for example data memory 109, that the requests are directed to has enough space.

In one example, the writer threads that are requesting to access memory to write are intercepted by allocation/deallocation evaluation circuit 107. In this example, this allocation request, which can be originated by, for example, SIMD processors 103, can include and/or point to information regarding an address of the memory location, memory ring, and/or the register of, for example, data memory 109, the allocation request wants to write to and the quantity of data the thread needs to write. Evaluation circuit 107 is configured to determine the space available for the memory location, memory ring, and/or the register addressed in the allocation request and compare the quantity of data to the available space. If evaluation circuit 107 determines that the memory location, memory ring, and/or the register has enough space for the allocation request, evaluation circuit 107 decrements the amount of available space by the quantity of data and allows the allocation request to continue its execution (e.g., write to the memory).

However, if evaluation circuit 107 determines that the addressed memory, for example in data memory 109, does not have enough space for the amount of data requested by the thread, evaluation circuit 107 does not allow the thread to execute and puts it to sleep. In one example, evaluation circuit 107 routinely checks the available space in the addressed memory to allow the thread for further execution.

In another example, the reader threads that are requesting to access memory to read are intercepted by allocation deallocation evaluation circuit 107. In this example, the read request can include or point to an address associated with the memory from which the threads request the read and the quantity of data to be read. In this example, evaluation circuit 107 intercepts the deallocation request, determines the quantity of data to be read, decrements the available space of the addressed memory, for example, data memory 109, and allows the read operation.

According to an exemplary embodiment, evaluation circuit 107 includes a hardware module (e.g., a register) (not shown) configured to contain the address of the memory location, memory ring, and/or register to which the allocation and/or deallocation requests address. Additionally, evaluation circuit 107 can include a hardware module (e.g., a register, counter, etc. 231) to store the available space (for example in word, double word (DW), etc.) for the memory location, memory ring, and/or register.

In one example, evaluation circuit 107 can include an identifier hardware module (e.g., a register) (not shown) configured to be used by evaluation circuit 107 to determine whether a request is an allocation request or a deallocation request. According to this example, the request intercepted by evaluation circuit 107 can include or point to an identifier indicating whether the request is initiated by a producer processing unit or a consumer processing unit. In this example, the request from the producer processing unit can be interpreted as the allocation request of writer threads that request to write in a memory. Following with this example, the request from the consumer processing unit can be interpreted as the deallocation request of read threads that request to read from the memory, for example, data memory 109. Evaluation circuit 107, according to this example, is configured to use the identifier hardware module (not shown) to identify the request as allocation or deallocation request based on the identifier of the request.

According to one exemplary embodiment, allocation deallocation evaluation circuit 107 is used in combination with an ordered operation circuit 121. For example, the ordered operation circuit can be similar to the operation circuit in the co-pending U.S. patent application Ser. No. 13/433,939, filed Mar. 29, 2012, which is incorporated by reference for its entirety. The ordered operation circuit 121 can be used for ordered execution of wavefronts for parallel processing devices.

Figure 2:
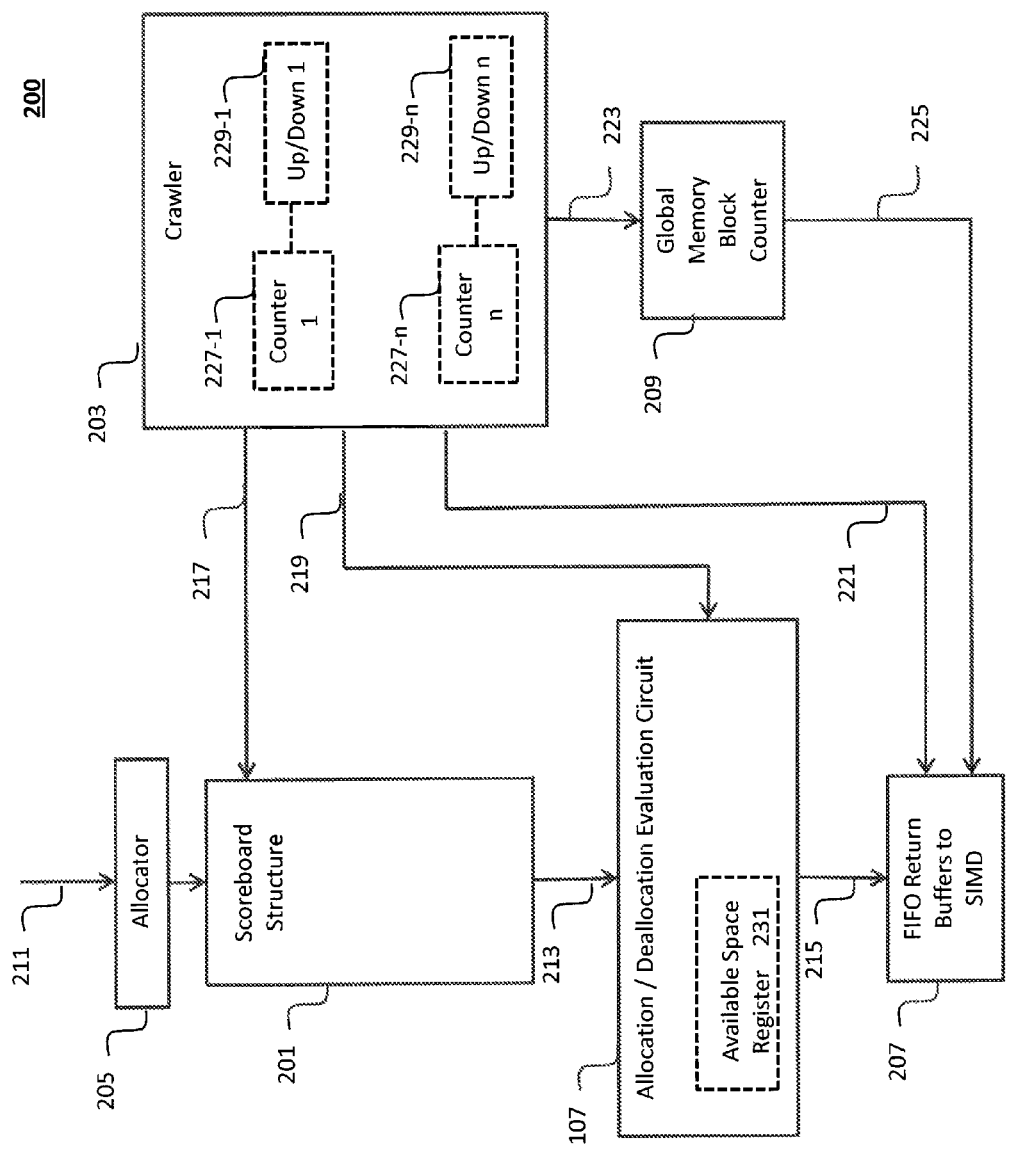
FIG. 2 illustrates an allocation/deallocation evaluation circuit in combination with an ordering operation circuit, in accordance with an embodiment of the present invention.

FIG. 2 illustrates an apparatus 200 for ordered operations wavefronts while efficiently evaluating available space in memory locations before instructions of such wavefronts are allowed, according to an embodiment of the present invention. For example, apparatus 200 can be used in SIMD processor block 101 of GPU 100 of FIG. 1. As noted above, although, this example is in accordance with a GPU, it should be apparent that the teachings of this disclosure are applicable to many other types of processors and processing such as, but not limited to, a multi-processor computer having parallel executing processes for different processing task or application.

In one example, apparatus 200 can be used for ordered operations wavefronts where only one ordered operation is requested for each wavefront and/or when multiple ordered operations are requested for each wavefront. For example, similar operations are discussed in co-pending application U.S. patent application Ser. No. 13/433,939, filed Mar. 29, 2012.

In one example, apparatus 200 includes a scoreboard structure 201, a crawler 203, an allocator 205, FIFO (first in first out) return buffer 207, a global memory block counter 209, and allocation deallocation evaluation circuit 107.

In one example, scoreboard structure 201 holds a set of wavefront records. Scoreboard structure 201 can be a queue or other data structure implemented in registers or other memory. The scoreboard structure 201 may have pre-allocated slots for wavefront records corresponding to an ordering scheme such as, but not limited to, launch identifier.

In one example operation, requests for ordered operation of wavefronts are received by apparatus 200 on an interface 211 (interface may also be understood to mean, e.g., a path, a trace, etc.) from, for example, the SIMD processors 103 (FIG. 1) and/or the command processor 105 (FIG. 1). In one example, allocator 205 determines an appropriate location in the scoreboard structure 201 for the incoming request and enqueues the request in the determined slot. The wavefront record corresponding to the enqueued entry can include wavefront information such as wavefront identifier, SIMD processors on which it is executing, a launch identifier that represents the sequence in which the wavefront was launched by the command processor, an address of a memory location, memory ring, and/or a register for allocation or deallocation, information associated to the data corresponding to the wavefront, etc.

In one example, crawler 203, alone and/or in combination with a control logic (not shown), continuously monitors scoreboard structure 201. In one embodiment, crawler 203 monitors each ordered slot in scoreboard structure 201 in sequence until a valid wavefront record is enqueued to that slot. A wavefront record is valid when any conflicts, such as read/write memory conflicts, related to the memory allocation have been resolved. In one example, the validity of the wavefront record can be indicated by setting a bit in scoreboard structure 201. An interface 217 between crawler 203 and scoreboard structure 201 enables the monitoring and selection of wavefront records by crawler 203. Another interface 223 enables crawler 203 to provide the selected wavefront, or more particularly an identifier such as a corresponding wavefront launch identifier, to update global memory block counter 209. In one example, global memory block counter 209 can be implemented using a register or memory accessible to the SIMD processors. Global memory block counter 209 includes functionality to allow atomic access for wavefront operations.

Although one crawler 203 is illustrated in FIG. 2, it is noted that apparatus 200 can include and/or be connected to a plurality of crawlers. In one example, each of the plurality of crawlers can be associated with a corresponding processing unit for a specific mode of operation (e.g., allocation mode, deallocation mode, etc.), and/or any other implementation specific structure.

In one example, scoreboard structure 201 is communicatively connected to allocation/deallocation evaluation circuit 107 using the interface 213. When crawler 203 determines a wavefront record from scoreboard structure 201 as the next wavefront based on an ordering scheme, the next wavefront record is selected and/or dequeued from scoreboard structure 201 and is forwarded to evaluation circuit 107. In one example, the ordering scheme can be based on the age of the wavefronts. Additionally, the age of the wavefronts can be determined based on launch identifiers that represent the sequence in which the wavefronts were launched by the command processor. However, it is noted that any other ordering schemes and/or identifiers can be implemented. For example, identifiers can be based on the age of processes or can be user or application generated, and/or can be generated by the processing units (such as SIMD processors 103) based on their prioritization, as long as the identifiers are consecutive and there are no holes in the identifiers (the set of identifiers are consecutive with no holes). The identifiers can also be generated by any counter, memory, or other device in the system.

With continuing reference to FIG. 2 and reference again to FIG. 1, evaluation circuit 107 can be configured to determine whether the selected wavefront includes an allocation request or a deallocation request. In one example, an identifier of a processing unit such as, but not limited to, SIMD processor block 101, SIMD processor 103, etc. is used to deter nine the category of the request. If the selected wavefront records include the allocation request, evaluation circuit 107 can, for example, determine an address of a memory, memory ring, and/or register, in for example data memory 109, for allocation, determine the available space in the memory, determine the amount of data to be written in the memory, and compare the available space to the quantity of data. In one example, a register, for example register 231 of FIG. 2, is accessed to determine the available space. In this example, the register, for example register 231, stores the amount of available space in the memory, memory ring, and/or register that was addressed in the request. If the memory contains enough space for the allocation request, the amount of available space (which is stored, for example, in the register 231) is decremented by the amount of data, the wavefront records are forwarded to FIFO return buffers to SIMD 207, and a notification is sent to crawler 203 over, for example, the interface 219. The notification indicates to crawler 203 that the wavefront records have been forwarded to FIFO 207 and crawler 203 can continue monitoring scoreboard structure 201.

On the other hand, if the memory, for example data memory 109, did not contain enough space for the allocation request, a notification is sent to crawler 203 over, for example, the interface 219. The notification indicates to crawler 203 that the wavefront records cannot be forwarded to FIFO 207 because of limited space in the addressed memory, for example data memory 109, and crawler 203 needs to stall monitoring scoreboard structure 201 until further notice from evaluation circuit 107.

According to one example, no other wavefront records are checked until enough space, for example in the addressed location in the data memory 109, is available for the current allocation request. In one example, evaluation circuit 107 routinely checks the available space in the addressed memory. For example, a reader thread can require access to the same memory location, read data from the memory, and therefore, more space becomes available in that memory location. When enough space is available, evaluation circuit 107 can forward the wavefront records to FIFO 207 for further execution and notify crawler 203 to continue monitoring scoreboard structure 201. It is noted than in addition to routinely checking for the available space, any other methods can be implemented such that evaluation circuit 107 could become aware when enough space in the addressed memory is available.

Alternatively, if the selected wavefront records include deallocation request, evaluation circuit 107 can, e.g., determine an address of a memory, memory ring, and/or register, in for example data memory 109, for deallocation, determine the available space in the memory, determine the amount of data to be written in the memory, and increment the value of available space in the memory, memory ring, and/or register, in for example data memory 109, (which is stored, for example, in the register 231) based on the amount of data. In one example, a register, for example register 231 of FIG. 2, is accessed to determine the available space. In this example, the register, for example register 231, stores the amount of available space in the memory, memory ring, and/or register that was addressed in the request. Further, the wavefront records are forwarded to FIFO 207 and a notification is sent to crawler 203 over, for example, the interface 219. The notification indicates to crawler 203 that the wavefront records have been forwarded to FIFO 207 and crawler 203 can continue monitoring scoreboard structure 201.

In one example, FIFO return buffers 207 store wavefront records, or parts thereof, that are selected and/or dequeued from scoreboard structure 201. For example, the records can be stored according to an ordering that is determined by crawler 203 or an evaluation, scheme determined by evaluation circuit 107 as described above. The global memory block counter 209 can return the global memory block counter pre-operation value to the subject wavefront on a SIMD processor through buffers 207. An interface 225 between global memory block counter 209 and buffers 207 can be used for communicating a global memory block counter pre-operation value. In one example, buffers 207 can be a first-in-first-out (FIFO) scheme from which the wavefront records, or partial wavefront records, along with the corresponding global memory block counter pre-operation value, can be retrieved for processing by a SIMD processor. For example, wavefronts can obtain the global memory block counter pre-operation value through buffers 207. Interfaces 213, 215, and 225, from scoreboard structure 201 and crawler 203 respectively, may enable the enqueueing of selected wavefront records or partial wavefront records to buffers 207.

As noted above, apparatus 200 can also be used when multiple ordered operations are requested for each wavefront. For example, a similar operation is discussed in more detail in the co-pending application U.S. patent application Ser. No. 13/433,939, filed Mar. 29, 2012. In this embodiment, crawler 203 can include optional multiple counters/pointers 227-1-227-*n* (collectively counters 227) and a plurality of up/down counters 229-1-229-*n* (collectively up/down counters 229) corresponding to multiple ordered operations for each wavefront. According to this example, apparatus 200 can also include a plurality of allocation deallocation evaluation circuits 107 associated with each of the counters/pointers 227-1-227-*n*. In this exemplary embodiment, a first evaluation circuit 107 associated with a first counter 227-1 can process an allocation request, while a second evaluation circuit (not shown) associated with a second counter 227-*n* can process a deallocation request.

Additionally or alternatively, apparatus 200 can include and/or be connected to a plurality of crawlers 203 each having one or multiple counters/pointers 227-1-227-*n*, where apparatus 200 includes multiple evaluation circuits, each associated with one counter/pointer 227-1-227-*n*.

Figure 3:
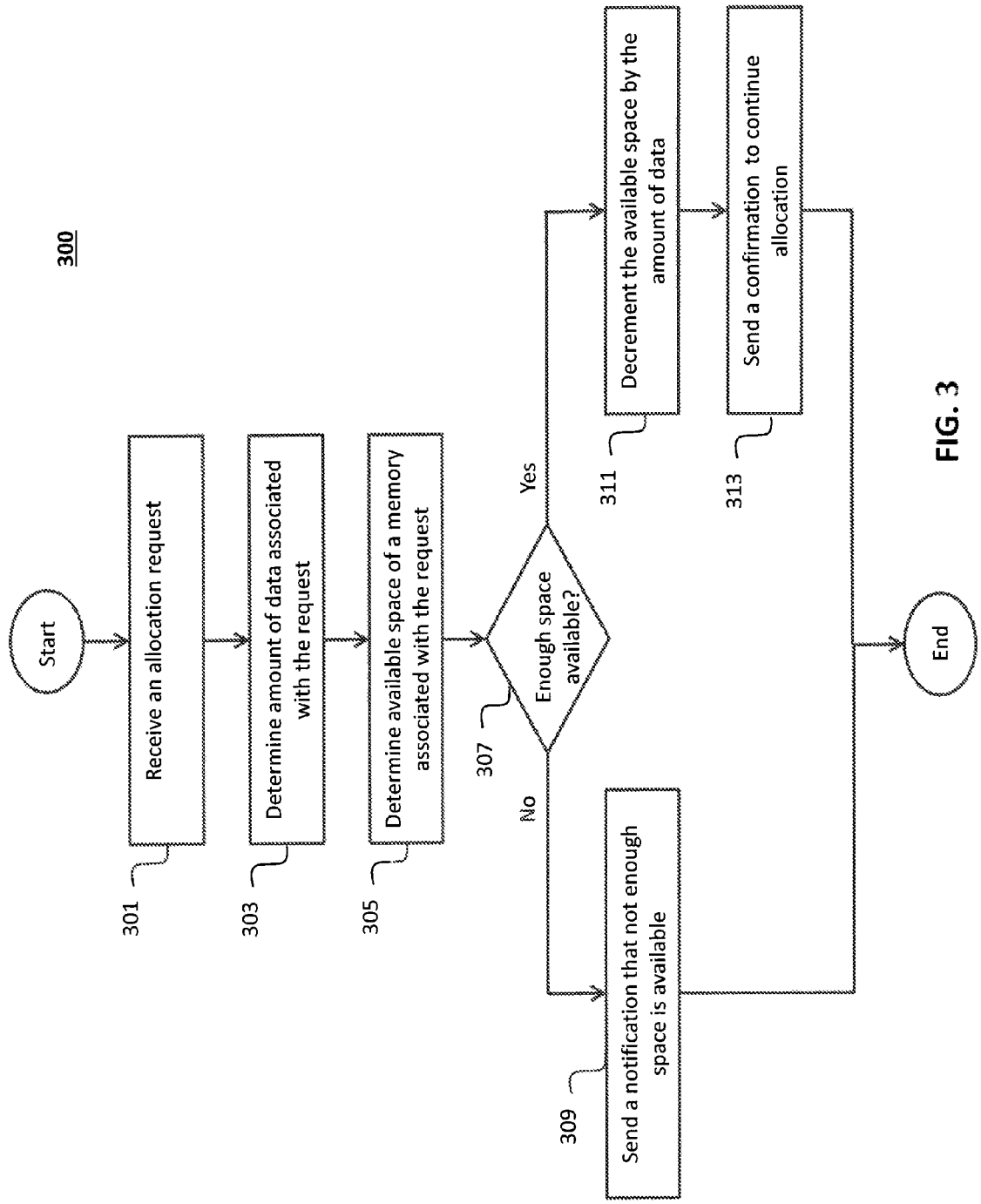
FIG. 3 is a flowchart illustrating an evaluation process for an allocation request, in accordance with an embodiment of the present invention.

FIG. 3 is a flowchart depicting a method 300, according to an embodiment of the present invention. For example, method 300 may be used to evaluate available space for allocation request. The processing steps of FIG. 3 can be used, for example, by allocation deallocation evaluation circuit 107 of FIGS. 1 and 2. It is to be appreciated the steps may not be performed in the order shown, and that some of the steps may be optional.

In step 301, a request for memory allocation is received by, for example, evaluation circuit 107.

In step 303, the amount of data associated with the allocation request is determined. In one example, the amount of data is in DW, but any other metric to measure the quantity of data can be used.

In step 305, an available space of a memory, memory ring, and/or register addressed in the request is determined. The memory can be addressed in, for example, the wavefront records of FIG. 2 using a memory address. In one example, a register, for example register 231 of FIG. 2, is accessed to determine the available space. In this example, the register, for example register 231, stores the amount of available space in the memory, memory ring, and/or register that was addressed in the request.

In step 307, the amount of data and the amount of available space in the memory (which is stored, for example, in the register 231) are compared and a decision is made whether enough space is available in the memory for the allocation request. If it is determined that the memory does not contain enough space for the allocation request, in step 309, a notification is sent, for example, to crawler 203 to indicate the lack of space in the memory. As discussed with respect to FIG. 2, in one example, crawler 203 will stall operation until further notification from, for example, evaluation circuit 107.

Alternatively, if it is determined that the memory includes enough space for the allocation request, in step 311, the available space (which is stored, for example, in the register 231) is decremented by the quantity of data. Further, in step 313, a notification is sent, for example, to crawler 203 to indicate that crawler 203 can continue to the next wavefront records and the current wavefront records will be forwarded to, for example, FIFO 207, along with corresponding global memory block counter pre-operation value, such that can be retrieved for processing by a SIMD processor.

Figure 4:
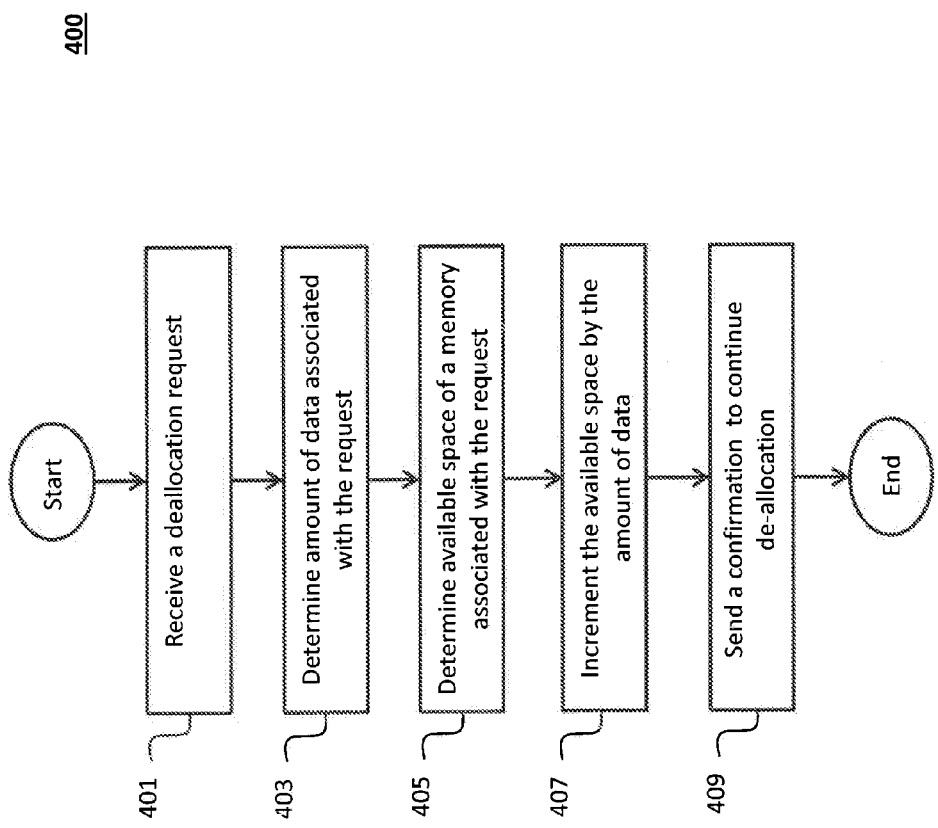
FIG. 4 illustrates an evaluation process for a deallocation request, in accordance with an embodiment of the present invention.

FIG. 4 is a flowchart depicting a method 400, according to an embodiment of the present invention. For example, method 400 may be used to evaluate available space for deallocation request. The processing steps of FIG. 4 can be used, for example, by allocation deallocation evaluation circuit 107 of FIGS. 1 and 2. It is to be appreciated the steps may not be performed in the order shown, and that some of the steps may be optional.

In step 401, a request for memory deallocation is received by, for example, evaluation circuit 107.

In step 403, the amount of data associated with the deallocation request is determined. In one example the amount of data is in DW, but any other metric to measure the quantity of data can be used. In step 405, an available space of a memory, memory ring, and/or register addressed in the request is determined. The memory can be addressed in, for example, the wavefront records of FIG. 2 using a memory address. In one example, a register, for example register 231 of FIG. 2, is accessed to determine the available space. In this example, the register, for example register 231, stores the amount of available space in the memory, memory ring, and/or register that was addressed in the request.

In step 407, the available space (which is stored, for example, in the register 231) is incremented by the quantity of data. Further, in step 409, a notification is sent, for example, to crawler 203 to indicate that crawler 203 can continue to the next wavefront records and the current wavefront records will be forwarded to, for example, FIFO 207, along with corresponding global memory block counter pre-operation value, such that can be retrieved for processing by a SIMD processor.

The embodiments described above can be described in a hardware description language such as Verilog, RTL, netlists, etc. and that these descriptions can be used to ultimately configure a manufacturing process through the generation of maskworks/photomasks to generate one or more hardware devices embodying aspects of the present invention as described herein.

Embodiments of the present invention yield several advantages over conventional methods of transferring processing outputs to memory. By opportunistically combining data outputs from one or more processing units and address information associated with the data outputs, embodiments of the present invention better utilize the entire communication bandwidth available from the processing units to the memory in order to yield substantially faster transfers of the output data to memory.

The embodiments described above can be described in a hardware description language such as Verilog, RTL, netlists, etc. and that these descriptions can be used to ultimately configure a manufacturing process through the generation of maskworks/photomasks to generate one or more hardware devices embodying aspects of the present invention as described herein.

Embodiments of the present invention yield several advantages over conventional methods of transferring processing outputs to memory. By opportunistically combining data outputs from one or more processing units and address information associated with the data outputs, embodiments of the present invention better utilize the entire communication bandwidth available from the processing units to the memory in order to yield substantially faster transfers of the output data to memory.

While various embodiments of the present invention have been described above, it should be understood that they have been presented by way of example only, and not limitation. It will be understood by those skilled in the relevant art(s) that various changes in form and details may be made therein without departing from the spirit and scope of the present invention as defined in the appended claims. It should be understood that the present invention is not limited to these examples. The present invention is applicable to any elements operating as described herein. Accordingly, the breadth and scope of the present invention should not be limited by any of the above-described exemplary embodiments, but should be defined only in accordance with the following claims and their equivalents.

The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the present invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. An apparatus, comprising:
an evaluation circuit, configured to:
receive a deallocation request to access a memory;
access a register to determine an amount of available space in the memory associated with the request; and
when the determined amount of available space accommodates an amount of data associated with the request, update the amount of available space stored in the register based on the amount of data;
the evaluation circuit further configured to:
increment the amount of available space stored in the register by the amount of data; and
send a confirmation to a crawler to deallocate the memory based on the request.

2. The apparatus of claim 1, further comprising:
at least one processor configured to execute a plurality of concurrent threads.

3. An apparatus comprising:
an evaluation circuit, configured to:
receive a request to access a memory;
access a register to determine an amount of available space in the memory associated with the request; and
when the determined amount of available space accommodates an amount of data associated with the request, update the amount of available space stored in the register based on the amount of data;
the apparatus further comprising: a scoreboard structure configured to enqueue information associated with a plurality of wavefronts.

4. The apparatus of claim 3, wherein:
the request comprises an allocation request; and
if the amount of data is less or equal to the amount of available space, the evaluation circuit is further configured to:
decrement the amount of available space stored in the register by the amount of data; and
send a confirmation to a crawler to allocate the memory based on the request.

5. The apparatus of claim 4, wherein the evaluation circuit is further configured to:
send a notification to the crawler to stall the request if the amount of data is more than the amount of available space stored in the register.

6. The apparatus of claim 3, wherein the request is a deallocation request and the evaluation circuit is further configured to:
increment the amount of available space stored in the register by the amount of data; and
send a confirmation to a crawler to deallocate the memory based on the request.

7. The apparatus of claim 3, further comprising:
a controller configured to determine a next one of the plurality of wavefronts to be processed based on the enqueued information and an ordering scheme.

8. The apparatus of claim 7, wherein
the evaluation circuit is communicatively connected to the scoreboard structure to receive wavefront records associated to the next one of the plurality of wavefronts; and
the evaluation circuit is communicatively connected to the controller to:
send an allocation confirmation to the controller to continue operation, if the amount of data is less or equal to the amount available space stored in the register; and send a notification to the controller to stall operation, if the amount of data is more than the amount of available space stored in the register.

9. The apparatus of claim 8, wherein the evaluation circuit is further configured to send a deallocation confirmation to the controller to continue operation in response to a deallocation request.

10. The apparatus of claim 8, further comprising:
a buffer communicatively connected to the evaluation circuit and configured to receive the wavefront records from the evaluation circuit.

11. A method, comprising:
receiving, by an evaluation circuit, a deallocation request to access a memory;
accessing a register to determine an amount of available space in the memory associated with the request; and
when the determined amount of available space accommodates an amount of data associated with the request, updating the amount of available space stored in the register based on the amount of data;
the method further comprising:
incrementing the amount of available space stored in the register by the amount of data; and
sending a confirmation to a controller to deallocate the memory based on the request.

12. A method, comprising:
receiving, by an evaluation circuit, a request to access a memory;
accessing a register to determine an amount of available space in the memory associated with the request; and
when the determined amount of available space accommodates an amount of data associated with the request, updating the amount of available space stored in the register based on the amount of data;
incrementing the amount of available space stored in the register by the amount of data; and
sending a confirmation to a controller to deallocate the memory based on the request;
the method further comprising:
enqueuing information associated with a plurality of wavefronts.

13. The method of claim 12, wherein the request comprises an allocation request and the method further comprises:
if the amount of data is less or equal to the amount of available space:
decrementing the amount of available space stored in the register by the amount of data; and
sending a confirmation to a controller to allocate the memory based on the request.

14. The method of claim 13, further comprising:
sending a notification to the controller to stall the request if the amount of data is more than the amount of available space stored in the register.

15. The method of claim 12, wherein the request is a deallocation request and the method further comprising:
incrementing the amount of available space stored in the register by the amount of data; and
sending a confirmation to a controller to deallocate the memory based on the request.

16. The method of claim 12, further comprising: determining a first wavefront according to an ordering scheme.

17. An article of manufacture including a computer-readable storage medium having instructions stored thereon, execution of which by a computing device causes the computing device to perform operations comprising:
receiving a deallocation request to access a memory;
accessing a register to determine an amount of available space in the memory associated with the request; and
when the determined amount of available space accommodates an amount of data associated with the request, updating the amount of available space stored in the register based on the amount of data;
the operations further comprising:
incrementing the amount of available space stored in the register by the amount of data; and
sending a confirmation to a controller to deallocate the memory based on the request.

18. An article of manufacture including a computer-readable storage medium having instructions stored thereon, execution of which by a computing device causes the computing device to perform operations comprising:
receiving a request to access a memory;
accessing a register to determine an amount of available space in the memory associated with the request; and
when the determined amount of available space accommodates an amount of data associated with the request, updating the amount of available space stored in the register based on the amount of data;
the operations further comprising:
enqueuing information associated with a plurality of wavefronts.

* * * * *